(No Model.) 2 Sheets—Sheet 1.

W. H. MEANS.
WAGON BRAKE.

No. 405,583. Patented June 18, 1889.

Witnesses:
G. W. Sweet
M. P. Smith

Inventor:
William H. Means,
By Thomas G. Orwig, Attorney.

(No Model.) 2 Sheets—Sheet 2.

W. H. MEANS
WAGON BRAKE.

No. 405,583. Patented June 18, 1889.

UNITED STATES PATENT OFFICE.

WILLIAM H. MEANS, OF RIVERTON, IOWA.

WAGON-BRAKE.

SPECIFICATION forming part of Letters Patent No. 405,583, dated June 18, 1889.

Application filed February 11, 1889. Serial No. 299,419. (No model.)

*To all whom it may concern:*

Be it known that I, WILLIAM H. MEANS, a citizen of the United States of America, and a resident of Riverton, in the county of Fremont and State of Iowa, have invented an Improved Vehicle-Brake, of which the following is a specification.

This invention relates to a brake mechanism that may be operated from the seat of a farm-wagon, from the rear end of the same when loaded with lumber, or from the top when used for hauling hay; and my invention consists in the construction, combination, and arrangement of parts, as hereinafter set forth, pointed out in the claims, and illustrated in the accompanying drawings, in which—

Figure 1:
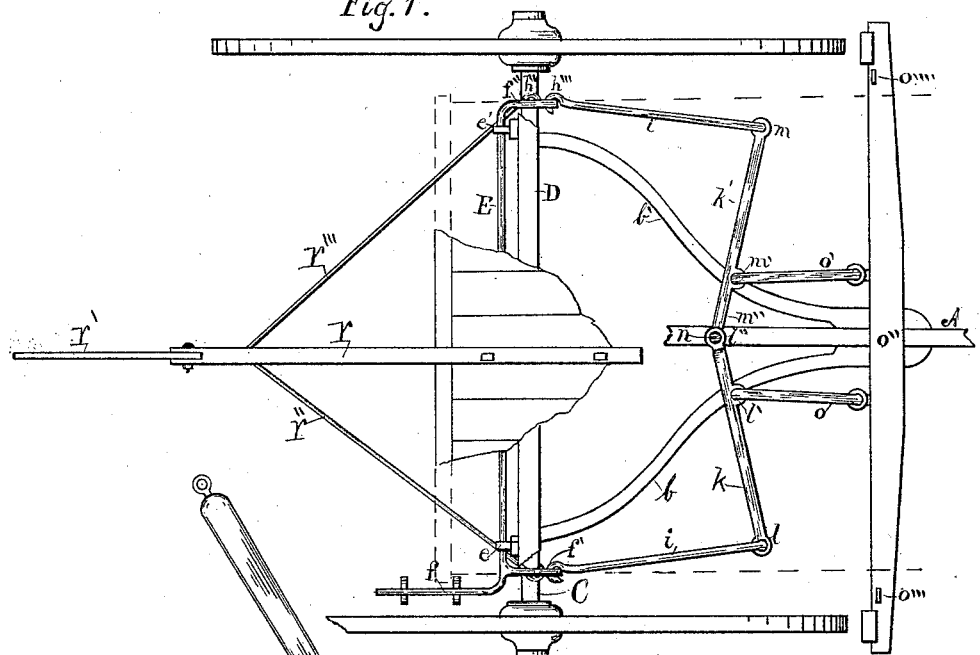
Figure 2:
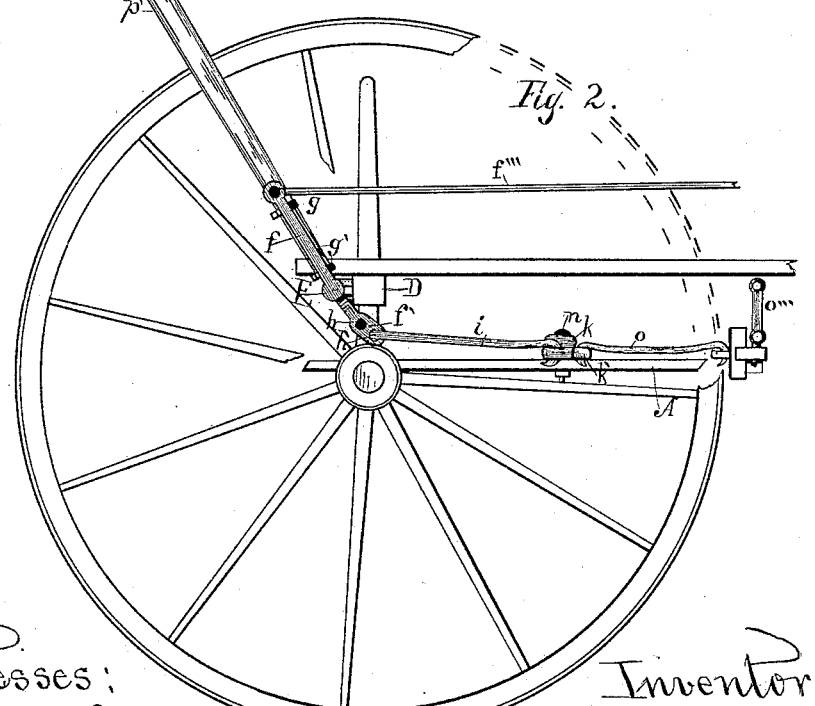
Figure 3:
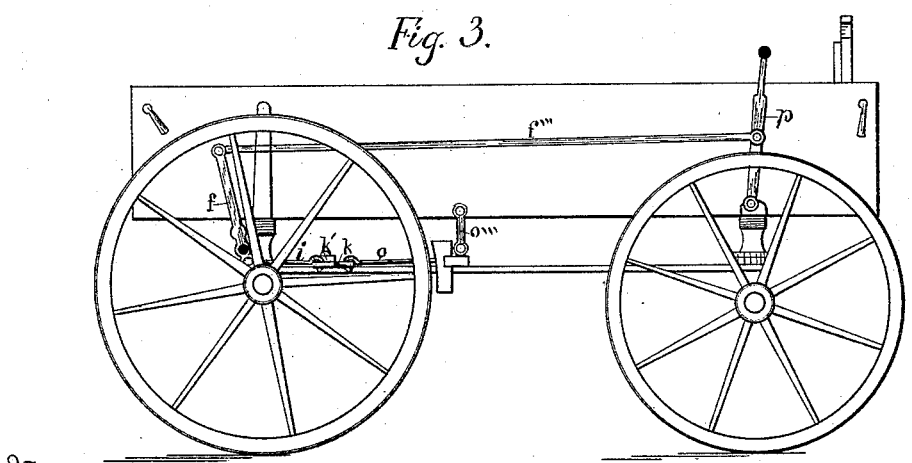
Figure 4:
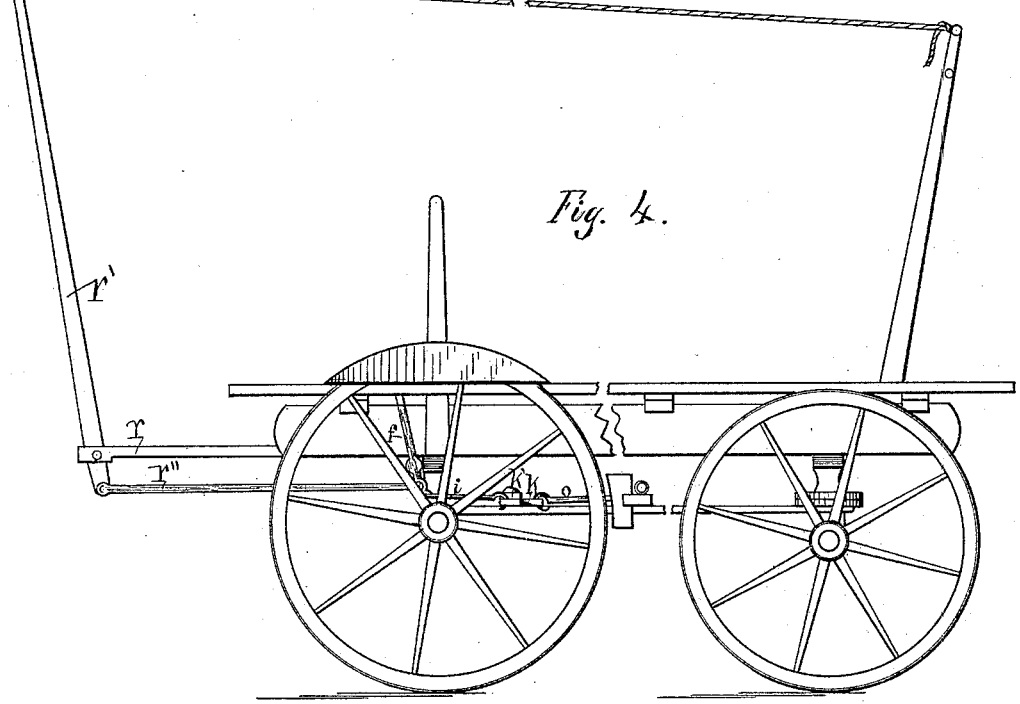

Figure 1 is a top view of the rear portion of a wagon to which the brake mechanism is applied; Fig. 2, a side elevation showing the brake adapted to be used on a wagon when loaded with lumber. Fig. 3 is a side view of an ordinary farm-wagon. Fig. 4 represents a wagon adapted for hauling hay and operating the brake mechanism by means of a rope stretched over hay on the wagon.

Similar letters of reference refer to corresponding parts.

A in the drawings represents the rear end of a wagon-reach; $b\ b'$, the hounds; C the axle, and D a suitable bolster, which is connected to the axle C in the usual manner.

The bolster D is provided with bearings $e\ e$, adapted to support a rock-shaft E, which is provided with the crank $f$ and integral arms $f'\ f''$. The crank $f$ is preferably curved, as shown in Fig. 1, and perforated at its end, and thereby adapted to receive the rear end of the reach-rod $f'''$.

$g\ g'$ are eyes fixed to the crank $f$, and adapted to receive the lower end of the extension-rod, as shown in Fig. 2.

The arms $f'$ and $f''$ are respectively provided with two sets of eye-bearings, (marked $h\ h'$ and $h''\ h'''$.) The lower set of these eye-bearings are adapted to hold the hooked ends of the rods $i\ i'$, which connect the arms $f'\ f''$ to the pivoted brake-levers $k\ k$, which extend laterally and ride upon the reach A and hounds $b\ b'$. These brake-levers $k\ k'$ are provided with bearings $l\ l'\ l''$ and $m\ m'\ m''$. The lever $k'$ is slightly curved near its inner end, so that it will pass over and rest upon the lever $k$, where both are movably connected by means of the pin $n$, which passes through the inner end bearings of the brake-levers, and also through a suitable opening in the reach A, where the pin forms the fulcrum-point of the levers. The intermediate bearings $l'\ m'$ of the levers are in the form of ears, and are adapted to receive the ends of the tension-rods $o\ o'$, which connect the brake-levers $k\ k$ to the horizontally-reciprocating rubber-bar $o''$. This bar, provided at the ends with suitable rubbers, works centrally upon the reach A and the hounds $b\ b'$, and is held and guided thereon by means of a suitable strap. At the ends the bar may be supported by means of the detachable rods $o'''\ o''''$, which are pivoted to the vehicle-body.

Ordinarily the brake is operated by means of the lever $p$, as shown in Fig. 3; but when hauling bulky freight, as bales or boxes, and when the driver is compelled to discard his seat and ride upon his load, he operates the brake by inserting the extension-rod $p'$, which forms part of my device, into the sockets or eyes $g\ g'$ of the crank $f$, and when on a load of hay he operates the brake by means of a line, which is connected to the upper end of the rod and passes to a post at the front end of the hay-rack. Being at an angle to the line of the perpendicular at the pivot-point, the rod has a tendency, by virtue of its weight, to continually force the brake into an open position, so that it is locked only so long as the line is taut.

When the wagon is used for carrying hay, the reach-rod $f'''$ and the extension-rod $p'$ are dispensed with. A support $r$, of any suitable material, is bolted to the bottom of the box or hay-rack, as shown in Figs. 1 and 4. This support is bifurcated at the end, and is adapted to hold the operating-bar $r'$, to which are connected the detachable rods $r''$ and $r'''$. These rods are bolted at one end to the lower end of the operating-bar $r'$, the free ends being engaged by the upper set of bearings $h\ h''$ of the arms $f'\ f''$. The rods $r''\ r'''$ in this connection act as reach-rods, as will be understood by referring to Figs. 1 and 4.

In connecting the support $r$ to the vehicle-body I prefer placing it a little aside of the center line, so that in working the operating-bar $r'$ may escape the pole used in binding the hay.

By using the extension-bar $r'$ I get a compound system of leverage, by means of which great power may be exerted upon the rubber-bar $o''$. The extended operating-bar $r'$ also has a tendency to continually force the brake into an open position, and is likewise operated by means of a line attached to its top end and extended forward within reach of the driver.

Having thus described my said invention, what I claim as new, and desire to secure by Letters Patent, is—

1. In a wagon-brake, the combination of a rock-shaft having a lever extending vertically and arms extending downward and supported in bearings located in rear of the rear axle, two levers pivoted in front of the same axle to extend outward and connected with the arms of the rock-shaft, and a brake-bar carrying wheel-rubbing devices on its ends and connected with the outer ends of said levers to operate in the manner set forth, for the purposes stated.

2. A wagon-brake comprising a rock-shaft having two integral arms and an upwardly-extending crank adapted to receive an extension-rod, by means of which said brake is operated, connecting-rods joining said arms to two horizontally-reciprocating brake-levers, and tension-rods connecting said brake-levers to a reciprocating rubber-bar, all substantially as described and set forth.

3. The combination, with a rock-shaft provided with dependent arms, of connecting-rods joining said shaft to two pivoted brake-levers, tension-rods uniting the brake-levers to a suitable rubber-bar, and a detachable support at the rear of the wagon-body adapted to carry an actuating-lever, said lever being connected at its lower end, by means of detachable rods, to the arms of said rock-shaft, all arranged and adapted to work substantially as described, and for the purposes set forth.

WILLIAM H. MEANS.

Witnesses:
 JOE SAMUELS,
 H. C. BYARS.